Jan. 25, 1955 R. M. CRAYFORD 2,700,731

AUTOMATIC ELECTRONIC SEQUENCE CONTROL

Filed Dec. 19, 1951

INVENTOR.

Robert M. Crayford

BY

Jay C. Taylor

ATTORNEY.

United States Patent Office 2,700,731

Patented Jan. 25, 1955

2,700,731

AUTOMATIC ELECTRONIC SEQUENCE CONTROL

Robert M. Crayford, Wayne, Mich., assignor to Lawrence F. Hill, Dearborn, Mich, trustee Application December 19, 1951, Serial No. 262,365

11 Claims. (Cl. 250—27)

Figure 2:
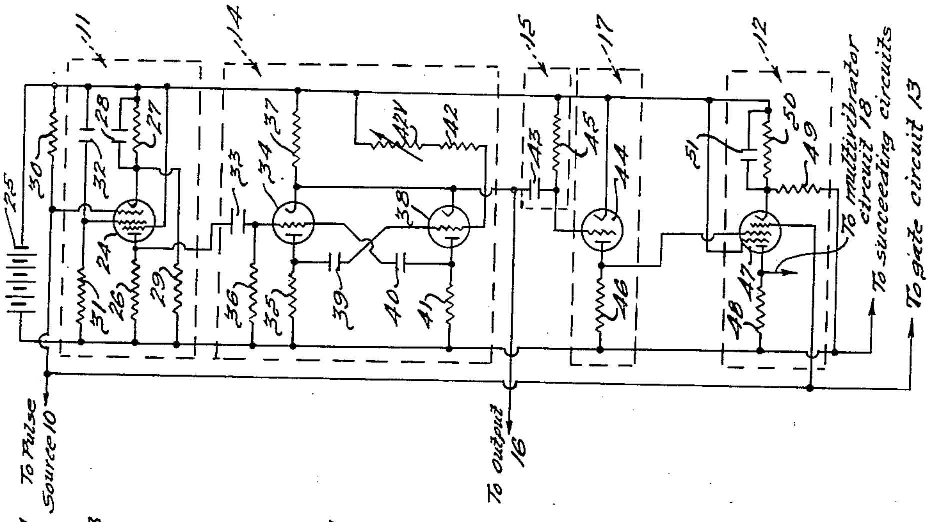

This invention relates to an improved method and apparatus for the electronic control and timing of repetitive or sequential operations, particularly those requiring precision order in time.

An object of the present invention is to provide a sequential control circuit adapted to respond to a repeating series of operating or synchronizing pulses, comprising a series of circuit stages, each circuit stage including an enabling gate to which the synchronizing pulses are transmitted simultaneously. The enabling gate of each circuit stage is operatively connected with a multivibrator circuit in the same circuit stage and is adapted, when enabled, to transmit said pulses to the connected multivibrator to initiate oscillation thereof. Each enabling gate after the first circuit stage is also operatively connected through a gate control circuit with the multivibrator circuit in the preceding circuit stage. Each multivibrator circuit is adapted to oscillate at a frequency so as to synchronize with a predetermined cyclically repeating pulse in said series of pulses, the gate control circuit connecting the multivibrator with the next succeeding enabling gate being adapted to respond to each vibration of the connected multivibrator to enable the connected gate circuit in predetermined timed relation with respect to each vibration of said connected multivibrator.

Another and more particular object is to provide a sequential control circuit of the foregoing character wherein the first circuit stage is activated in response to the first pulse in said repeating series of pulses and each next successive circuit stage is activated in turn by each next successive pulse in said series.

Another and more specific object of the present invention is to provide a sequential control method and apparatus suitable for use in conjunction with a method of color television wherein the picture signal is broadcast in a number of color cycles such as red, green, and blue, in a repeating series. The picture signal during each cycle is broadcast in response to light within a predetermined color or frequency range from the original scene to be televised. Thus during the red cycle, the scene to be broadcast or televised is scanned through a red filter, which passes substantially only light within a red color range, and the energy impulses of the filtered red light are broadcast to the television receiving stations for reproduction on the view screen of the picture tube as the "red" field.

In accordance with the Columbia Broadcasting System sequential frame system of color television commonly known as C. B. S., the so-called "red" field appears on the view plate in black and white contrast and is viewed by the television audience through another red filter adapted to pass substantially only light within the same red color or frequency range that was employed for the broadcast. In accordance with still another system of color television, the "red" field is reproduced on the view plate in black and white contrast and also in reversed polarity with respect to the C. B. S. "red" field, i. e. in the nature of a photographic negative. Areas of the view plate corresponding to red areas of the original broadcast scene are not energized and therefore are dark, whereas areas of the view plate corresponding to the non-red areas of the original scene are energized and are thereby caused to fluoresce brightly. Red color is added to the picture by illuminating the view plate during the red cycle with red light of substantially the same frequency range that was employed for the broadcast. The dark or non-energized areas of the view plate are thus brightly illuminated red, whereas the added red light on the fluorescent areas of the view plate is not appreciable visually noticeable.

In accordance with still another system of color television, the electron beam of the picture tube is successively directed during the red cycle along a number of closely spaced coated lines on the view plate. These lines are coated with a material which, when energized by the electron beam, is caused to glow or fluoresce as a red color substantially in the same frequency range that was employed for the broadcast.

In either of the above systems, the green and blue cycles are treated in the same manner, except of course that light within either a green or a blue color or frequency range is substituted for the red light. By repeating the red, green, and blue cycles in rapid succession, the illusion of a continuous scene in natural color is effected.

For the purpose of synchronizing the vertical and horizontal oscillators of the television receiving set with the corresponding vertical and horizontal oscillators of the broadcast station, two distinct synchronizing pulses, commonly referred to as the vertical sync pulse and the horizontal sync pulse, are broadcast with the picture signal.

It is another purpose of this invention to provide improved means for employing one of the aforesaid sync pulses, particularly the vertical sync pulse, to synchronize either of the above discussed television color additive systems with the respective broadcast color cycles. The last two systems discussed, wherein the electron beam is selectively directed during each color cycle to different areas of the view plate which are differently coated so as to fluoresce red, green, or blue, or wherein the view plate is selectively illuminated with a red, green, or blue light during the corresponding color cycle, are particularly amenable to electronic control and timing by the method and means disclosed herein.

Other objects of this invention will appear in the following description and appended claims, reference being had to the accompanying drawings forming a part of this specification wherein like reference characters designate corresponding parts in the several views.

Figure 1:
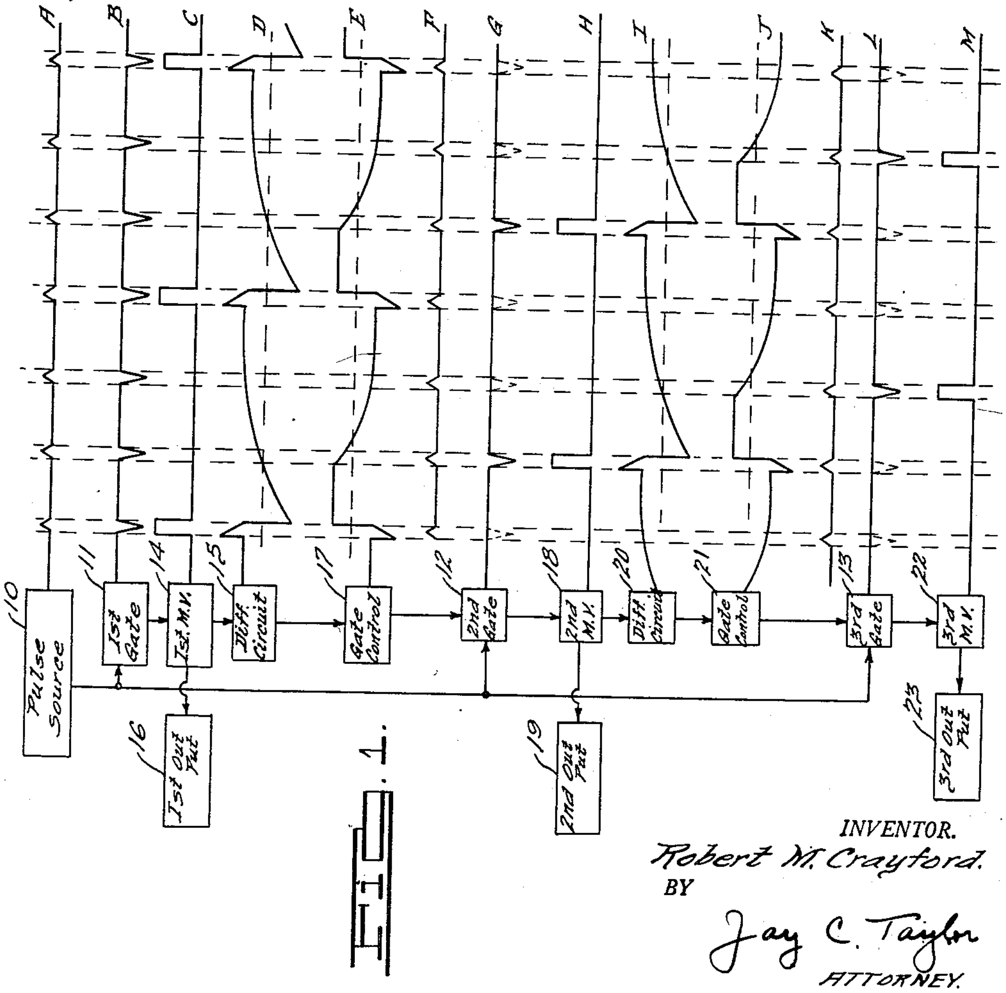

Fig. 1 is a diagrammatic illustration of an electronic control system embodying the present invention, wherein certain electrical potentials associated with the several circuits in the system are plotted as ordinates against time as the abscissa. The several curves A through M shown have a common time unit increasing to the right to illustrate the time relationships between potential variations in the curves. However the ordinates or potentials are plotted without regard to a common unit, so that the value of the potential is only approximately proportional to the corresponding ordinate distance along any one curve and differs appreciably from one curve to another. In the curves A through M:

Curve A is a representation of the operating or vertical sync pulse as applied to the control grids in the three gate circuits;

Curve B is a representation of the plate potential in the first gate circuit;

Curve C is a representation of the cathode potential of the first multivibrator circuit;

Curve D is a representation of the differentiated pulse from the first multivibrator circuit and of the grid potential of the first gate control circuit, the limiting grid potential below which the plate current of said first gate control circuit ceases being indicated by a dotted line;

Curve E is a representation of the plate potential of the first gate control circuit and of the screen grid potential of the second gate circuit, the limiting screen grid potential above which said second gate circuit is enabled being indicated by a dotted line;

Curve F is a duplication of the operating or vertical sync pulse of curve A to facilitate comparison with the potentials of the second gate circuit;

Curve G is a representation of the plate potential of the second gate circuit, the operating pulses which are not amplified and transmitted by the second gate circuit being indicated by dotted lines;

Curve H is a representation of the cathode potential of the second multivibrator circuit;

Curve I is a representation of the differentiated pulse from the second multivibrator circuit and of the grid potential of the second gate control circuit, the limiting grid potential below which the plate current of said second gate control circuit ceases being indicated by a dotted line;

Curve J is a representation of the plate potential of the second gate control circuit and of the screen grid potential of the third gate circuit, the limiting screen grid potential above which said third gate circuit is enabled being indicated by a dotted line;

Curve K is a duplication of the operating or vertical sync pulse of curve A to facilitate comparison with the potentials of the third gate circuit;

Curve L is a representation of the plate potential of the third gate circuit, the operating pulses which are not amplified and transmitted by the third gate circuit being indicated by dotted lines; and Curve M is a representation of the cathode potential of the third multivibrator circuit.

Fig. 2 is a simplified schematic circuit diagram illustrating details of a system of electronic circuits corresponding to the circuits of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention is illustrated by way of example comprising an electronic control system which is particularly adapted for television color control as discussed above. In Fig. 1, a repeating electronic operating pulse from a pulse source 10 is applied simultaneously in the present instance to three enabling gate circuits 11, 12, and 13 to initiate the several timed reactions, such as the alternate flashing of red, green, and blue lights in synchronism with the corresponding color frames. Any feasible electronic pulse occurring in a predetermined cyclic regularity suitably related to the frequency of the operation or operations to be controlled may be employed as the operating pulse. In television color control, use of the broadcast vertical sync pulse is feasible. This pulse is indicated by curve A to the right of the pulse source 10 as a succession of pips equally spaced in time.

The first gate circuit 11 is normally open or enabled and serves to amplify and transmit the operating pulse, as indicated by curve B, to the first multivibrator circuit 14 to initiate oscillation of the latter. The second and third gate circuits 12 and 13 are normally closed enabling gates, so that the pulse applied thereto is not transmitted to subsequent circuit stages until these gates are enabled, as discussed below.

The multivibrator circuit 14 is designed to oscillate with a compaartively large sudden potential pulse, curve C, in the manner of a relaxation oscillator, the multivibrator pulse occurring substantially simultaneously with its triggering or initiating pulse transmitted by gate 11 and having many times the amplitude thereof, being for example, fifty or one hundred times as large or more. Thus small potential irregularities between the successive multivibrator pulses, such as the second and third sync pulses, see curves A, B, and C, will have no objectionable effect on the circuit operation. The natural vibration frequency of the oscillator circuit 14 is predetermined to correspond in a suitable manner to the frequency of the operation or operations to be controlled thereby. In application with a tri-color system of color television as discussed above, the multivibrator 14 is adjusted to oscillate freely at a natural vibration period sufficiently close to one-third the sync pulse frequency, so as to synchronize with the sync pulse automatically at exactly one-third the frequency thereof.

The pulse of multivibrator 14 occurring practically simultaneously with every third sync pulse is transmitted simultaneously to a differentiating circuit 15, as discussed below, and to an output stage 16. The latter is employed by means well known to the art to actuate any cyclic operation having a frequency suitably related to the multivibrator frequency, as for example to energize a source of colored light in repeating timed relation with each third sync pulse for flashing the colored light on a television view plate in synchronism with the corresponding color field also occurring with each third sync pulse.

The differentiating circuit 15 is designed to give a predetermined wave form to the multivibrator pulse transmitted thereto, curve D, and to transmit the differentiated wave or pulse to a gate control circuit 17 for actuation of the latter in predetermined time relationship with respect to the sync pulse. By suitably actuating the gate control circuit, the latter is caused to enable gate circuit 12 to pass only the second or next successive sync pulse immediately following the pulse of multivibrator 14, whereupon gate 12 again closes. Gate circuit 12 amplifies the second sync pulse and transmits the amplified sync pulse, curve G, to multivibrator circuit 18, which similarly to multivibrator 14, is designed to vibrate at a natural frequency suitably corresponding to the frequency of a second operation or set of operations to be controlled thereby. In the present instance multivibrator 18 is likewise designed to synchronize with its initiating pulse, i. e. the second sync pulse, and with every third sync pulse thereafter. The pulse from multivibrator 18, curve H, is transmitted to a second output stage 19 which controls the illumination of the television view plate with a second colored light, for example, in properly timed relation with respect to the broadcast color picture field. Likewise the pulse from multivibrator 18 is transmitted through a differentiating circuit 20 to gate control circuit 21. These circuits serve similarly to the corresponding circuits 15 and 17 and enable the third gate 13 to pass only the third or next successive sync pulse immediately following the pulse of multivibrator 18, whereupon gate 13 again closes.

It is apparent that the foregoing sequence of operation could be repeated for any feasible number of gate circuits employed with multivibrators of suitable vibration periods. Only three gate circuits are employed for the present illustration, since only three primary color fields are broadcast. Gate 13 amplifies and transmits the third sync pulse, curve L, whereupon the amplified pulse is transmitted through multivibrator 22 to the third output stage 23. The latter controls the illumination of the television view plate by the third colored light, for example, in properly timed relation with respect to the third picture field. Multivibrator 22 is similar to multivibrators 14 and 18 in the present instance and vibrates in synchronism with the third and each successive third sync pulse thereafter, curve M. On the fourth sync pulse, the foregoing operational sequence is repeated, multivibrators 14, 18, and 22 synchronizing with the fourth, fifth, and sixth sync pulses respectively. The operation continues repetitively, starting with each third sync pulse after the first.

Details of a preferred system of electronic circuits for carrying out the foregoing control operation are illustrated by way of example in Fig. 2. The gate circuit 11, enclosed within a dotted rectangle, includes a normally enabled or conducting pentode 24 having its anode connected to the power source or positive side of battery 25 through resistance 26 and having its cathode connected to ground or the negative side of battery 25 through resistance 27, which latter is bypassed by condenser 28 to minimize variations in the grid bias. The cathode of tube 24 is also connected to the power through resistance 29 to maintain a suitable cathode potential below the minimum value at which conduction of tube 24 ceases, so that tube 24 is normally conducting when its control grid is at the ground potential.

The control grid of tube 24 is connected with the source of the pulse, which in an application for television color control preferably comprises the broadcast vertical sync pulse. This pulse may be taken from any suitable circuit of the television receiving set, as for example from the plate or anode of the sync separator tube. Resistance 30 provides a return to ground and bias for the control grid. In accordance with conventional practice, the screen grid of tube 24 is connected through resistance 31 to the power and through condenser 32 to ground. Similarly the suppressor grid of tube 24 is connected to ground.

Upon application of the first positive sync pulse, curve A, to the control grid of tube 24, conduction of that tube increases and the plate potential thereof drops almost simultaneously as an amplified trigger pulse, curve B, which is applied through condenser 33 to the grid of triode 34 in the multivibrator circuit 14. The latter is also enclosed within a dotted rectangle. The plate and grid of tube 34 are connected through resistances 35 and 36 respectively to the power and the cathode is connected through resistance 37 to ground, the resistances being determined so that the grid is slightly positive with respect to the cathode, whereby tube 34 is normally conducting heavily. Upon the application of the first reduced potential pulse from gate circuit 11, curve B, to the grid of tube 34, the plate current of tube 34 decreases and the plate potential thereof increases. Triode 38 in the multivibrator circuit 14 is initially non-conducting by virtue of its grid coupled through condenser 39 to the plate or anode of tube 34. When the plate potential of tube 34 rises as a result of the aforesaid first low potential pulse from circuit 11, the grid potential and plate current of tube 38 also rise and the plate potential of the latter tube drops. The drop in plate potential of tube 38 is coupled through condenser 40 to the grid of tube 34, causing a still greater increase in plate potential of the latter tube. This action continues until conduction of tube 34 ceases and conduction of tube 38 is at or near saturation. By this time the suddenly acquired negative surge charge, applied to the plate side of condenser 40 during the rise in plate current of tube 38, begins to discharge rapidly through resistances 36 and 41, the latter resistance connecting the plate of tube 38 and the plate side of condenser 40 to the power. As condenser 40 discharges, the grid potential of tube 34 rises until that tube begins to conduct again and its plate potential drops, reducing the potential on the plate side of condenser 39 and the grid of tube 38 until conduction of that tube again stops.

The foregoing action is very rapid, so that a sudden sharp multivibrator pulse, curve C, having many times the amplitude of the first pulse from gate 11, occurs practically simultaneously with the latter pulse. Condenser 39 and resistance 35, as well as resistance 42 and variable resistance 42*v*, which latter two resistances are connected in series between the grid of tube 38 and the ground, are predetermined so that the negative surge charge acquired by the plate side of condenser 39 during the rise in plate current of tube 34 will discharge too slowly to permit repetition of the cycle by the time of the third sync pulse. However by the time of the fourth sync pulse, condenser 39 will be discharged sufficiently and the potential of the grid of tube 38 will be correspondingly raised sufficiently to permit repetition of the cycle upon application of said fourth pulse from gate circuit 11 to the grid of tube 34. Thus the multivibrator 14 will oscillate in synchronism with the first and every succeeding third sync pulse thereafter. Variable resistance 42*v* is provided to afford adjustment of the vibration period of multivibrator 14. As indicated in Fig. 2, the cathode pulse of multivibrator 14 is coupled with output circuit 16 for actuation thereof in synchronized relation with the first and each succeeding third sync pulse thereafter.

The pulse from the cathode of multivibrator 14 is also applied through condenser 43 to the grid of triode 44 in gate control circuit 17, enclosed by dotted lines, the grid side of condenser 43 being also connected to ground through resistance 45. The latter, together with condenser 43, are selected to comprise differentiating circuit 15, enclosed by dotted lines, which shapes the multivibrator pulse as indicated by curve D. The values of condenser 43 and resistance 45 are suitably determined so that practically simultaneously with the first sync pulse and first multivibrator pulse, the grid potential of tube 44 will rise somewhat. In consequence, the plate current of tube 44 passing from the power through resistance 46 simultaneously increases and the plate potential of tube 44 simultaneously decreases, as indicated by curve E. Thereafter the differentiated potential represented by curve D decreases and, immediately after the first sync and multivibrator pulse, drops below the dotted line representing the cut-off grid potential below which tube 44 ceases to conduct. Correspondingly, the plate potential of tube 44 rises. When tube 44 ceases to conduct, its plate potential acquires the full potential of battery 25. Thereafter, the differentiated potential represented by curve D, i. e. the grid potential of tube 44, gradually rises and crosses the dotted line of curve D approximately at the time of the second sync pulse. Thus tube 44 begins to conduct and its plate potential indicated by curve E begins to drop approximately at the time of the second sync pulse.

The plate potential of tube 44 is connected directly to the screen grid of pentode 47 in the gate circuit 12, enclosed by dotted lines, so that curve E also represents the screen grid potential of tube 47. The plate and cathode of tube 47 are connected to the power through resistances 48 and 49 respectively. The cathode of tube 47 is also connected to ground through resistance 50, which latter is bypassed by condenser 51 to minimize variations in the grid bias of the tube. The control grid and suppressor grid of tube 47 are connected respectively to the sync pulse source 10 and to ground. Resistances 48, 49, and 50 are determined so that tube 47 is prevented from conduction, even when the positive sync pulse is applied to its grid, until its screen grid potential is above the dotted line of curve E which intersects the screen grid potential curve at or slightly after the end of the second sync pulse. Above the dotted line of curve E, tube 47 is enabled to amplify and transmit the sync pulses substantially in the manner of gate circuit 11.

Referring again to curve D (grid potential of tube 44) and to curve E (plate potential of tube 44 and screen grid potential of tube 47) the grid potential of tube 44 continues to increase gradually after crossing the dotted line until the time of the fourth sync pulse. Correspondingly, the plate potential of tube 44 and screen grid of tube 47 drop gradually. At or shortly after completion of the second sync pulse, the plate potential curve E crosses the dotted line whereat tube 47 is no longer enabled. Thus immediately after the first sync pulse, tube 47 is enabled to transmit the second sync pulse, but during the time of the first sync pulse and also from a time shortly after the second sync pulse until the fourth sync pulse, tube 47 is not enabled and cannot transmit any sync pulse. At the time of the fourth sync pulse and second multivibrator pulse, operation of the first circuit stage comprising circuits 11, 14, 15 and 17 is repeated.

The representation of the sync pulse which is applied simultaneously to the control grids of tubes 24 and 47 is repeated in curve F to facilitate comparison of the circuits. Curve G shows the plate potential of tube 47 in the gate circuit 12 for the second circuit stage comprising circuits 12, 18, 20, and 21. The latter three circuits are the same as their corresponding circuits 14, 15, and 17 in the first circuit stage and are accordingly not illustrated in detail.

When the second positive sync pulse is applied to the grid of tube 47, the plate potential drops sharply to magnify and transmit that pulse to the second multivibrator circuit 18, whereupon the latter completes its first oscillation. Upon completion of the second sync pulse and first pulse of multivibrator 18, tube 47 is no longer enabled as aforesaid and its plate potential returns to the maximum value. The first and third sync pulses and the succeeding third sync pulses after the first and third sync pulses, which are not transmitted, are indicated by dotted lines in curve G.

The second multivibrator 18 will vibrate in synchronism with the second, fifth, and each succeeding third sync pulse thereafter as indicated by curve H. This multivibrator pulse is coupled with the second output 19 for actuation thereof in synchronized timed relationship with the second and each succeeding third sync pulse thereafter. Each pulse of multivibrator 18 is also differentiated as indicated by curve I, so as to control the grid potential, curve I, and plate potential, curve J, of the triode in gate control circuit 21, corresponding to triode 44, which in turn controls the screen grid potential, curve J, of the gate control pentode in the third enabling gate circuit 13, corresponding to pentode 47.

Gate circuit 13 and multivibrator circuit 22 comprise the third circuit stage and are not illustrated in detail since they are the same as their corresponding circuits 12 and 14 above described. Thus gate circuit 13 is enabled to transmit only the third, sixth, and every succeeding third sync pulse thereafter applied to its grid, as indicated in curve L. The first and second sync pulses and succeeding third sync pulses after both the first and second sync pulses, which are not transmitted by gate 13, are indicated by dotted lines in curve L. Again the sync pulse which is applied to the control grid of the pentode in the third gate circuit, and simultaneously to the control grids of tubes 24 and 47, is repeated in curve K to facilitate comparison of the time relationship between the circuits. The amplified pulse from gate circuit 13 occurring substantially simultaneously with the third and each succeeding third sync pulse is applied to the third multivibrator 22, causing the latter to oscillate in synchronism with the transmitted sync pulses, curve M, whereby output circuit 23 is also actuated in synchronized relation with the third and each succeeding third sync pulse.

I claim:

1. In an electronic control circuit comprising a series of circuit stages adapted to operate cyclically in response to a repeating series of electrical pulses, an enabling gate circuit associated with each circuit stage and adapted to be connected with a source of said pulses, the gate circuit associated with the first circuit stage being normally enabled to transmit said pulses and the other of said gate circuits being normally closed to transmission of said pulses, a multivibrator circuit associated with each gate circuit for oscillation in response to a pulse transmitted thereby and adapted to oscillate in synchronism with selected cyclicly reoccurring pulses in said series, and means for enabling each normally closed gate circuit for transmission of said pulses to the associated multivibrator circuit in predetermined timed relationship to the oscillations of the multivibrator circuit in the next preceding circuit stage comprising a gate control circuit operatively connecting each normally closed gate circuit with the multivibrator circuit in the next preceding circuit stage.

2. In an electronic control circuit comprising a series of circuit stages adapted to operate cyclically in response to a repeating series of electrical pulses, an enabling gate circuit associated with each circuit stage and adapted to be connected with a source of said pulses, an oscillator circuit associated with each gate circuit for oscillation in response to a pulse transmitted thereby and adapted to oscillate in synchronism with selected cyclicly reoccurring pulses in said series, and a gate control circuit operatively connecting each oscillator circuit with the gate circuit in the next succeeding stage to enable that gate circuit for transmission of said pulses in predetermined timed relationship with respect to oscillation of the last named oscillator circuit.

3. In an electronic control circuit comprising a series of circuit stages adapted to operate cyclically in response to a repeating series of electrical pulses, an enabling gate circuit associated with each circuit stage and adapted to be connected with a source of said pulses, the gate circuit associated with the first circuit stage being normally enabled to transmit said pulses and the other of said gate circuits being normally closed to transmission of said pulses, a plurality of multivibrator circuits, one operatively connected with one of each of the circuits for oscillation in synchronism with a cyclicly reoccurring pulse transmitted thereby, circuit means operatively connecting each normally closed gate with the multivibrator circuit in the next preceding circuit stage to enable the connected gate circuit for passage of the next successive pulse in said series immediately following each multivibrator pulse in the last named multivibrator circuit.

4. In an electronic control circuit adapted to operate cyclicly in response to a repeating series of electrical pulses, a normally enabled gate circuit connected with a source of said pulses for transmission of the latter, a multivibrator circuit having a sharp vibration pulse and a natural vibration frequency adapted to synchronize with every third pulse in said repeating series, said oscillator circuit being connected with said normally enabled gate circuit for oscillation in response to the pulses transmitted thereby, a normally closed enabling gate circuit connected with said source and adapted to be enabled to transmit said pulses, gate control circuit means connected with said normally closed gate circuit for enabling the same in predetermined timed relationship with respect to actuation of said gate control circuit means, the latter being also connected with said multivibrator circuit for actuation by each pulse of the latter, a second multivibrator circuit similar to the first and connected with said normally closed gate circuit for oscillation in response to the pulses transmitted thereby, a second gate control circuit means connected with said second normally closed gate circuit for enabling the same in predetermined timed relationship with respect to actuation of said second gate control circuit means, the latter being also connected with said second multivibrator circuit for actuation by each pulse of the latter, and a third multivibrator circuit similar to said first and connected with second normally closed gate circuit for oscillation in response to the pulses transmitted thereby.

5. In an electronic control circuit adapted to operate cyclicly in response to a repeating series of electrical pulses, a normally enabled gate circuit connected with a source of said pulses for transmission of the latter, a multivibrator circuit having a sharp vibration pulse and a natural vibration frequency adapted to synchronize with every third pulse in said repeating series, said oscillator circuit being connected with said normally enabled gate circuit for oscillation in response to the pulses transmitted thereby, a normally closed enabling gate circuit connected with said source and adapted to be enabled to transmit said pulses, gate control circuit means connected with said multivibrator circuit for actuation by each pulse of the latter and also connected with said normally closed gate circuit, said gate control circuit means being adapted to enable said normally closed gate circuit for passage of the next successive pulse only in said series immediately following each multivibrator pulse, a second multivibrator circuit similar to the first and connected with said normally closed gate circuit for oscillation in response to the pulses transmitted thereby, a second gate control circuit means connected with said second multivibrator circuit for actuation by each pulse of the latter and also connected with said second normally closed gate circuit, said second gate control circuit means being adapted to enable said second normally closed gate circuit for passage of the next successive pulse only in said series immediately following each pulse of the second multivibrator circuit, and a third multivibrator circuit similar to said first and connected with said second normally closed gate circuit for oscillation in response to the pulses transmitted thereby.

6. In an electronic control circuit comprising a series of circuit stages adapted to operate cyclically in response to a repeating series of electrical pulses, an enabling gate circuit associated with each circuit stage and adapted to be connected with a source of said pulses, the gate circuit associated with the first circuit stage being normally enabled to transmit said pulses, each of the other of said gate circuits having a control element and being enabled to transmit said pulses when the potential of its control element is within a predetermined range, a multivibrator circuit connected with each gate circuit for oscillation in synchronism with a cyclicly reoccurring pulse in said series transmitted by the gate circuit, and a gate control circuit connected with the control element of each of said other gate circuits and operative in response to oscillation of the multivibrator circuit in the next preceding circuit stage to apply said predetermined potential to said element in predetermined timed relationship with respect to said oscillation.

7. In an electronic control circuit comprising a series of circuit stages adapted to operate cyclically in response to a repeating series of electrical pulses, an enabling gate circuit associated with each circuit stage and adapted to be connected with a source of said pulses, the gate circuit associated with the first circuit stage being normally enabled to transmit said pulses, each of the other of said gate circuits having a control element and being enabled to transmit said pulses when the potential of its control element is within a predetermined range, a multivibrator circuit connected with each gate circuit for oscillation in synchronism with a cyclicly reoccurring pulse in said series transmitted by the gate circuit, and means connecting the control element of each of said other gate circuits with the multivibrator circuit in the next preceding circuit stage comprising a gate control circuit operative in response to each oscillation of the last defined multivibrator circuit to apply said predetermined potential to said element in predetermined timed relationship with respect to each oscillation.

8. An electronic control circuit comprising a succession of enabling gate circuits adapted to be connected with a source of a repeating series of electrical pulses, the first of said succession of gate circuits being normally enabled to transmit said pulses and each of the succeeding gate circuits having a control element and being enabled to transmit said pulses when the potential of said control element is within a predetermined range, a plurality of multivibrator circuits, each having a characteristic vibration pulse and being connected with one of each of said gate circuits for synchronization of the multivibrator pulse with a pulse transmitted by the gate circuit at a predetermined frequency, and means for enabling each of said succeeding gate control circuits for transmission of each pulse in said series immediately following the multivibrator pulse of the immediately preceding multivibrator circuit comprising an operative potential control circuit connected with the last defined multivibrator circuit for operation in response to each pulse thereof and also operatively connected with the control element of the next successive gate circuit for applying the potential thereto at which the gate circuit is enabled.

9. In an electronic control circuit, a succession of circuit stages, each comprising an enabling gate circuit including a vacuum tube having a control grid and a screen grid and being enabled to transmit an electrical pulse applied to its control grid when the screen grid is at a predetermined enabling potential, the screen grid being normally biased at a potential below said enabling potential, each circuit stage also including a multivibrator circuit connected with the gate circuit to vibrate in response to the pulse transmitted thereby, and a gate control circuit connecting each multivibrator circuit with the screen grid in the next succeeding gate circuit to apply said enabling potential thereto in predetermined timed relation with respect to said vibration of the multivibrator.

10. In an electronic control circuit, a succession of circuit stages, each comprising an enabling gate circuit including a vacuum tube having a control grid and a screen grid and being enabled to transmit an electrical pulse applied to its control grid when the screen grid is at a predetermined enabling potential, the screen grid being normally biased at a potential below said enabling potential, each circuit stage also including a multivibrator circuit having a predetermined vibration period and connected with the gate circuit for vibration in response to pulses transmitted thereby, and a gate control circuit operatively connecting each multivibrator with the next succeeding gate circuit comprising a vacuum tube having a control grid and connected with the screen grid of said next succeeding gate circuit, and means for operating the last named vacuum tube to apply the enabling potential to the connected screen grid in timed relation with respect to vibration of the preceding multivibrator circuit comprising a differentiating circuit connecting the control grid of said last named vacuum tube with said preceding multivibrator circuit.

11. In an electronic control circuit, a multivibrator circuit, a gate circuit comprising a vacuum tube having a control grid and a screen grid and being enabled to transmit an electrical pulse applied to its control grid when the screen grid is at a predetermined enabling potential, a control vacuum tube having a control grid and being in an operative circuit to apply said enabling potential to said screen grid upon application of a predetermined control potential to its control grid, means for applying said control potential to the grid of said control tube in predetermined timed relationship with respect to vibration of the multivibrator circuit including a differentiating circuit connected with the multivibrator circuit to differentiate the vibration pulse thereof and also connected with the grid of said control tube to apply the differentiated pulse thereto.

References Cited in the file of this patent

UNITED STATES PATENTS

| | | |
|---|---|---|
| 2,158,285 | Koch | May 16, 1939 |
| 2,418,127 | Labin | Apr. 1, 1947 |
| 2,443,198 | Sallach | June 15, 1948 |
| 2,560,600 | Schafer | July 17, 1951 |
| 2,592,228 | Adams, Jr. | Apr. 8, 1952 |